United States Patent
Schoele et al.

(10) Patent No.: US 9,774,231 B2
(45) Date of Patent: Sep. 26, 2017

(54) BRUSH SYSTEM FOR AN ELECTRIC MOTOR

(71) Applicant: Brose Fahrzeugteile GmbH & Co. KG, Wuerzburg, Wuerzburg (DE)

(72) Inventors: Rainer Schoele, Leinach (DE); Frank Hartmann, Kitzingen (DE); Peter Stockmann, Gerbrunn (DE)

(73) Assignee: Brose Fahrzeugteile GmbH & Co KG, Wuerzburg, Wuerzburg (DE)

( * ) Notice: Subject to any disclaimer, the term of this patent is extended or adjusted under 35 U.S.C. 154(b) by 442 days.

(21) Appl. No.: 14/555,192

(22) Filed: Nov. 26, 2014

(65) Prior Publication Data

US 2015/0084479 A1 Mar. 26, 2015

Related U.S. Application Data

(63) Continuation of application No. PCT/EP2013/001540, filed on May 24, 2013.

(30) Foreign Application Priority Data

May 26, 2012 (DE) ........................ 10 2012 010 483

(51) Int. Cl.
*H02K 13/00* (2006.01)
*H02K 5/14* (2006.01)
(Continued)

(52) U.S. Cl.
CPC ........... *H02K 13/006* (2013.01); *H02K 5/148* (2013.01); *H02K 11/25* (2016.01); *H02K 23/66* (2013.01);
(Continued)

(58) Field of Classification Search
CPC ...... H02K 5/148; H02K 13/006; H02K 23/66; H02K 11/25
See application file for complete search history.

(56) References Cited

U.S. PATENT DOCUMENTS 2,357,906 A * 9/1944 Osterheld ................ H05B 3/42
174/126.1
3,808,573 A 4/1974 Cappell
(Continued)

FOREIGN PATENT DOCUMENTS

CH 276254 A 6/1951
CN 1918776 A 2/2007
(Continued)

OTHER PUBLICATIONS

Chinese Office Action for Chinese Application No. 201380027738.0 dated May 4, 2016—English translation.

*Primary Examiner* — Dang Le
(74) *Attorney, Agent, or Firm* — Muncy, Geissler, Olds & Lowe, P.C.

(57) ABSTRACT

A brush system for an electric motor, having a substantially semiannular resistor housing into which an electric flat resistor is introduced, two resistor terminals which protrude from the resistor housing and can be coupled in an electrically conducting manner to a conductor path of the electric motor, and a substantially semi-circular support plate that includes two bus bars to electroconductively couple the conductor path to the terminals and to two brush elements. The two terminals are arranged on the same narrow side of the resistor housing.

12 Claims, 4 Drawing Sheets

(51) Int. Cl.
*H02K 23/66* (2006.01)
*H02K 11/25* (2016.01)
*H02K 11/026* (2016.01)

(52) U.S. Cl.
CPC ........ *H02K 11/026* (2013.01); *H02K 2209/00* (2013.01)

(56) References Cited

U.S. PATENT DOCUMENTS

| | | |
|---|---|---|
| 7,511,397 B2 | 3/2009 | Eisert et al. |
| 8,258,661 B2 | 9/2012 | Yamazaki et al. |
| 8,749,110 B2 * | 6/2014 | Wong ............... H02K 1/17 310/154.22 |
| 2008/0204188 A1 | 8/2008 | Gass et al. |

FOREIGN PATENT DOCUMENTS

| | | |
|---|---|---|
| CN | 101931299 A | 12/2010 |
| CN | 202889118 U | 4/2013 |
| CN | 202906677 U | 4/2013 |
| DE | 295 12 310 U1 | 12/1996 |
| DE | 10 2005 032 393 A1 | 1/2007 |
| DE | 10 2005 032 394 A1 | 1/2007 |
| DE | 10 2007 054 872 A1 | 5/2008 |
| FR | 2 780 578 A1 | 12/1999 |
| WO | WO 2005/078907 | 8/2005 |

* cited by examiner

BRUSH SYSTEM FOR AN ELECTRIC MOTOR

This nonprovisional application is a continuation of International Application No. PCT/EP2013/001540, which was filed on May 24, 2013, and which claims priority to German Patent Application No. 10 2012 010 483.9, which was filed in Germany on May 26, 2012, and which are both herein incorporated by reference.

BACKGROUND OF THE INVENTION

Field of the Invention

The invention relates to a brush system for an electric motor, having a substantially semi-annular resistor housing with a flat electrical resistor introduced therein, having two resistor terminals which protrude from the resistor housing and can be coupled in an electrically conductive manner with a conductor path of the electric motor, as well as having a substantially semicircular support plate with two bus bars for the electro-conductive coupling of the conductor path to the terminals and having two brush elements, connected to interference-suppression elements, as sliding contacts for a commutator of the electric motor. The invention relates further to an electric motor having such a brush system.

Description of the Background Art

An electric motor, particularly a so-called commutator motor, has a stator and a rotor which is arranged on a motor shaft and is moved within the stator by an alternating magnetic field. The rotor carries a field or excitation winding and the motor shaft has commutator segments, which are fixed to the rotor and brushed by the sliding contact in the form of brushes of a brush system. The brush system and the commutator segments interact during the rotation of the motor axis such that a pole reversal (commutation) of the operating or motor current is achieved. This pole reversal is necessary for the rotational movement of an electric motor operated with a direct current. The brushes typically made as carbon brushes are pressed by spring elements with a spring force against the commutator which is concentric with the motor shaft. During operation of the electric motor, the direct current flows over the brushes and the commutator segments of the commutator into the excitation windings of the rotor.

In this type of electric motor, a stepped speed control occurs in a conventional manner by means of a resistance circuit. The resistance circuit heats up during operation due to the direct current flowing through it. The arising heat generation can lead to overheating of the electric motor, which may have a negative effect on its lifetime.

WO 2005/078907 A1, which corresponds to U.S. Pat. No. 7,511,397, discloses a brush system for an electromotive drive, in which brush system elements with brush elements and interference-suppression elements are fastened to a support plate. Bus bars are provided as conductor tracks for an electrical connection on the support plate. The brush system has a flat resistor disposed in a semicircular resistor housing, whereby the resistor housing has a thermally conductive material and is provided with air passage holes. By integration of the resistor in the brush system and due to the design of the resistor housing with air passage openings, an air-cooled brush system suitable for dissipating or removing heat generated during operation is provided.

In the prior-art brush system, a connecting lug of the flat resistor to a narrow side of the half ring of the resistor housing is provided, as a result of which an effective and space-saving cable routing of the conductor tracks and the positioning of the brush system elements on the base plate are disadvantageously made more complicated. As a result, the production and assembly costs of such brush systems increase disadvantageously.

SUMMARY OF THE INVENTION

It is therefore an object of the invention to provide a brush system of the that enables simply and cost-effectively an improved cable routing and an improved positionability of the brush system elements. Furthermore, an electric motor with such a brush system is to be provided.

In an embodiment, it is provided, that both resistor terminals of the flat resistor can be positioned on one, i.e., the same narrow side of the resistor housing. This allows for advantageously and simply disposing the bus bars on one side on the support plate, as a result of which a greater flexibility in the positioning of the brush and interference-suppression elements is made possible, and a relatively great, particularly maximum, potential separation between the associated poles is achieved.

In an embodiment, on the one hand, the brush and interference-suppression elements are arranged on the bottom side of the support plate and, on the other, the bus bars on the top side of the support plate. This assures an especially simple cable routing with a simultaneously improved positionability of the brush system elements. Furthermore, a simple and cost-effective protection to prevent electrolytic reactions with respect to corrosion prevention is realized in this way, and the electromagnetic compatibility (EMC) with respect to irradiation and emission is optimized.

In an embodiment, the bus bars of both flat conductor terminals of the resistor can be expediently routed, for example, on the opposite side of the motor (top side) to the supply terminals (plus and minus poles) of the electric motor. Placing the flat resistor terminals on the support plate side (bottom side), opposite to the brush and interference-suppression elements, makes it possible to prevent corrosion due to chemical electrolytic processes, for example. It is likewise conceivable, for example, to interchange the arrangement on the top and bottom side.

The flat conductor resistor terminals can be arranged spaced apart from one another on the narrow side of the resistor housing and thus separated galvanically from one another. To this end, the terminals can also be electrically isolated from one another. The terminals can be separated spatially (galvanically) from one another especially by three millimeters, for instance, as a result of which the risk of a short circuit between the terminals is reduced advantageously and cost-effectively.

In an embodiment, the flat resistor can have a meandering, substantially U-shaped course between the two terminals and extends substantially over the entire length of the resistor housing. In contrast to the prior art, in which the flat resistor extends substantially in an I shape from the first narrow side of the half ring to the second side, the flat resistor runs in two rows with an arch between the first and second narrow side of the housing. The flat resistor path is approximately doubled thereby, as a result of which the flat resistor can be made much flatter with the same resistance value. Thus, the thickness of the resistor housing can also be reduced advantageously and the brush system can be made especially compact.

Furthermore, because of the meandering and U-shaped design of the flat resistor course, an especially uniform heat convection on the resistor housing is realized, so that the arising generated heat can be removed from the electric motor especially effectively, for example, in conjunction with the air passage holes of the resistor housing. An especially simple and cost-effective improvement of the motor cooling is made possible thereby, which increases the lifetime of the electric motor advantageously and simply.

In an embodiment, the resistor housing can include two semi-annular housing parts arranged on top of one another, in whose interspace the flat resistor is inserted. In a preferred embodiment, the resistor housing is made in a sandwich-like manner, whereby the semi-annular housing parts can be fabricated of metal, and whereby the flat resistor placed in a meandering pattern is separated galvanically from said metal half rings.

In particular, to this end, in a suitable design, an electrically nonconductive isolation layer can be arranged in the assembled state of the resistor housing between each semi-annular housing part and the flat conductor. The isolation layers can be made of mica and thereby can be made, on the one hand, resistant to the high working temperature of the flat resistor and, on the other, especially flat because of the high dielectric constant of mica. An advantageous space-saving construction of the resistor housing is enabled in this way, with the simultaneous prevention of an electrical short circuit.

In an embodiment, the semi-annular housing parts can be shell-shaped and have at least on their outer circumference, but suitably also on the inner circumference, lugs for joining together the resistor housing. The lugs in the assembled state are expediently bent inward or crimped. This enables advantageously an especially simple and cost-effective production of the resistor housing.

In an embodiment, the semi-annular housing parts can be made of a metal and are coupled in a thermally conductive manner to a motor housing of the electric motor, for example, to a pole cover. In an advantageous refinement, the contacting between the outer circumference of the brush system, therefore the semi-annular housing parts, and the motor housing, is made as "metal-to-metal," as a result of which, because of thermal convection, the generated heat can also be removed via the motor housing. This improves the cooling of the electric motor, resulting on the one hand in an increased lifetime and, on the other, in a prolonged service life.

In a further embodiment, the resistor housing can have a number of locking brackets for nondestructive clip attachment to the electric motor, on the one hand, and to the support plate, on the other. This allows for the resistor housing to be especially simple to assemble or dismantle, as a result of which the maintenance or repair of the electric motor is advantageously simplified, for example.

In an embodiment, an electric motor includes a motor housing, which accommodates a stator and a rotor and a commutator brushed by a current-carrying brush system of the invention. In the case of a preferred use of the brush system, for example, in an actuating element or a radiator frame in a motor vehicle, the electric motor is therefore especially suitable in regard to a reliable and long-lasting operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
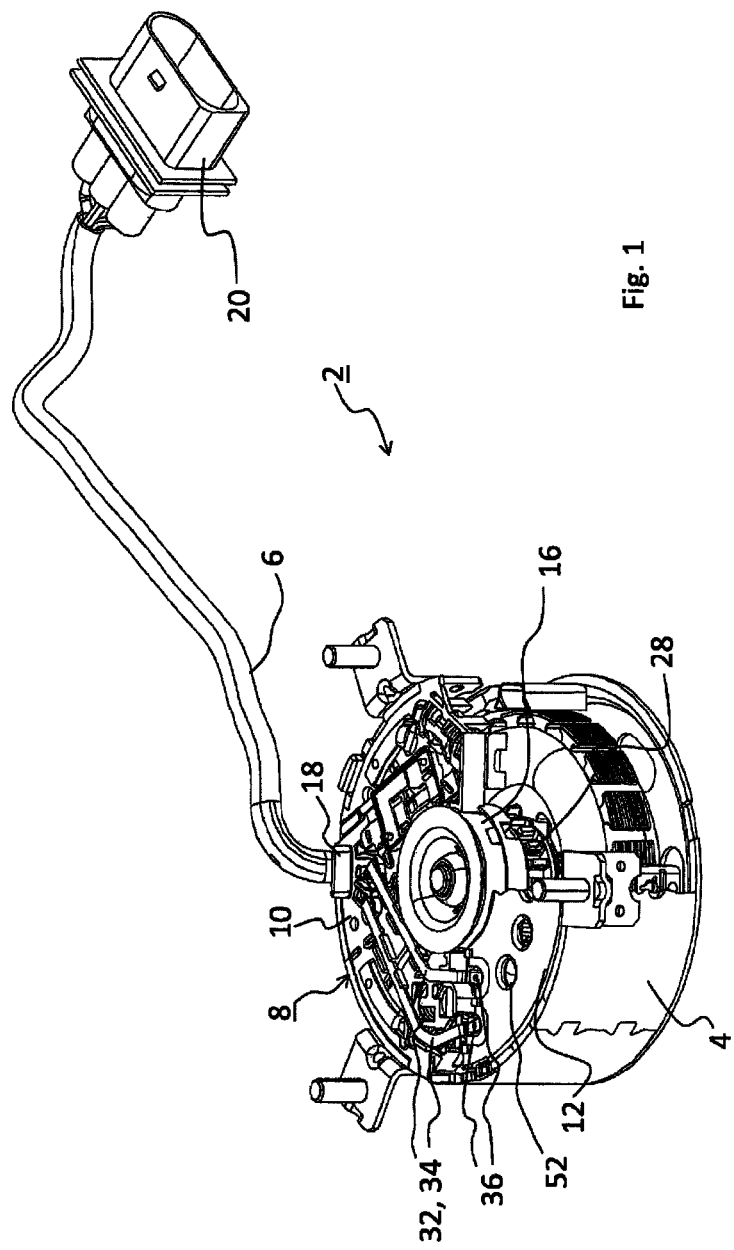
FIG. 1 shows in a perspective view an electric motor with a partially exposed motor housing and with a power connection, as well as with a brush system.

FIG. 1 shows an electromotive drive 2 with a metal motor housing 4 and with an electrical cable 6 for connecting to a conductor path and with a brush system 8. Brush system 8 is substantially circular and is formed, on the one hand, by a semi-annular support plate 10 made of an electrically nonconductive material, particularly plastic, and, on the other, by a likewise semi-annular metallic resistor housing 12. Brush system 8 has a central cut-out 14, in which in the assembled state an electric motor 16 is disposed. Brush system 8 in the assembled state is coupled to motor housing 4. Cable 6 has a plug-in connector 18 to drive 2 on the motor side and a plug type connector 20 on the conductor path side.

Figure 2:
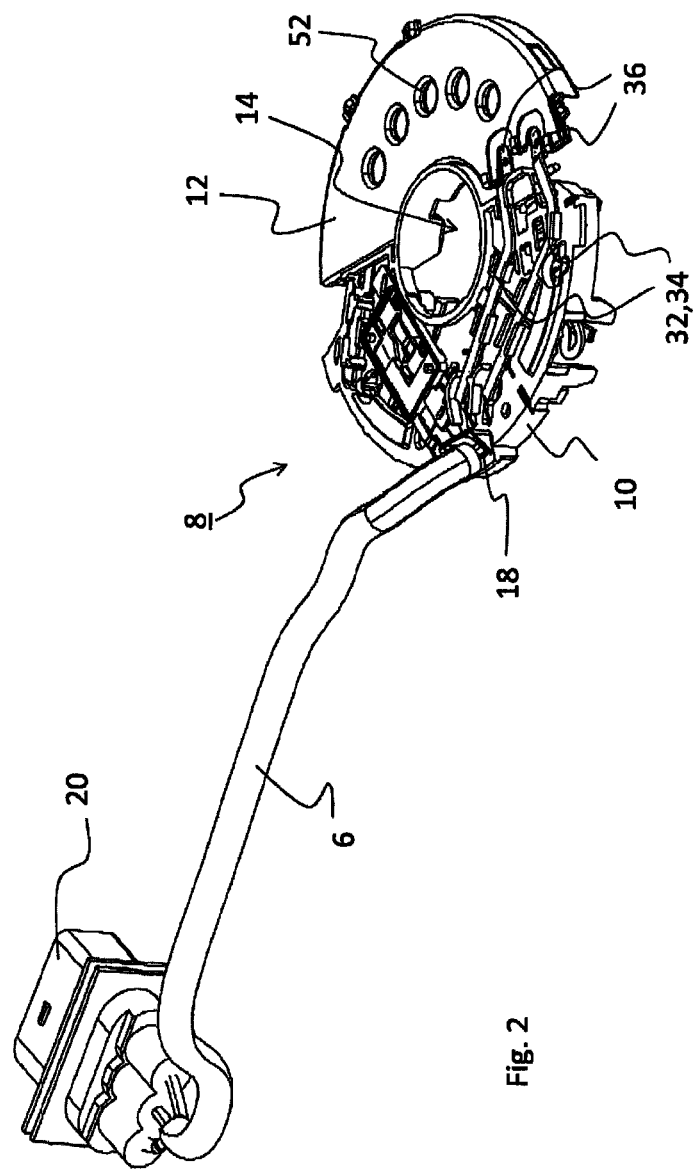
FIG. 2 shows in a perspective view a power connection and the brush system coupled thereto, comprising a support plate and a resistor housing.
Figure 3:
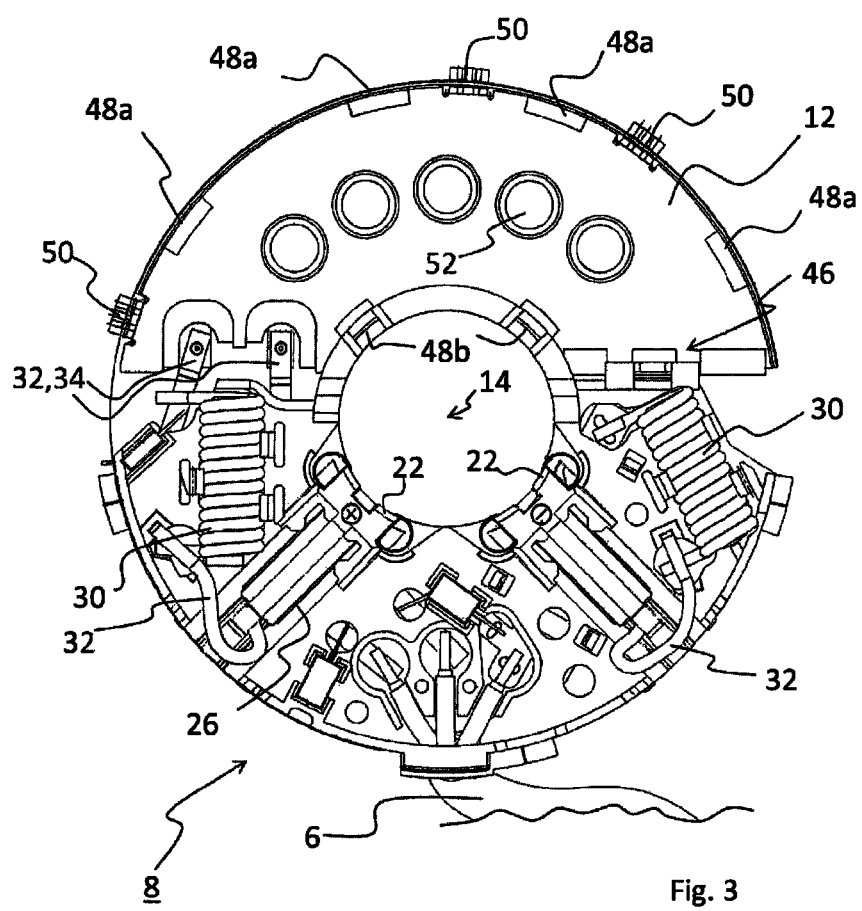
FIG. 3 shows a bottom side of the brush system in a plan view.

Brush system 8 is shown in greater detail in FIGS. 2 and 3. On the bottom side (FIG. 3) of support plate 10 produced as an injection-molded part, two carbon brushes 22 are disposed as sliding contacts on the circumference of a rotor, not shown in greater detail, of electric motor 16. As shown for only one of carbon brushes 22, these are located together with a spring element in a brush holder 26. The particular carbon brush 22 is pressed against a commutator 28 by the spring element under suitable spring preload, so that the particular carbon brush 22 lies in a contacting manner against commutator 28 or its commutator segments.

Carbon brushes 22 are each connected by means of a suppression choke (choking coil) 30 in a current path 32 labeled with a plus sign (+) and minus sign (−). Current path 32 is connected via commutator 28 and the rotor via cable 6 to a battery of a vehicle or to its on-board electrical system. Current path 32 on the brush system top side of support plate 10 is substantially formed by two parallel bus bars 34 connected to terminals 36, made as connecting lugs or the like, of a flat resistor 38 of resistor housing 12 or are fixed directly to flat resistor 38. Flat resistor 38 is used for a stepped speed control of electromotive drive 2.

Figure 4:
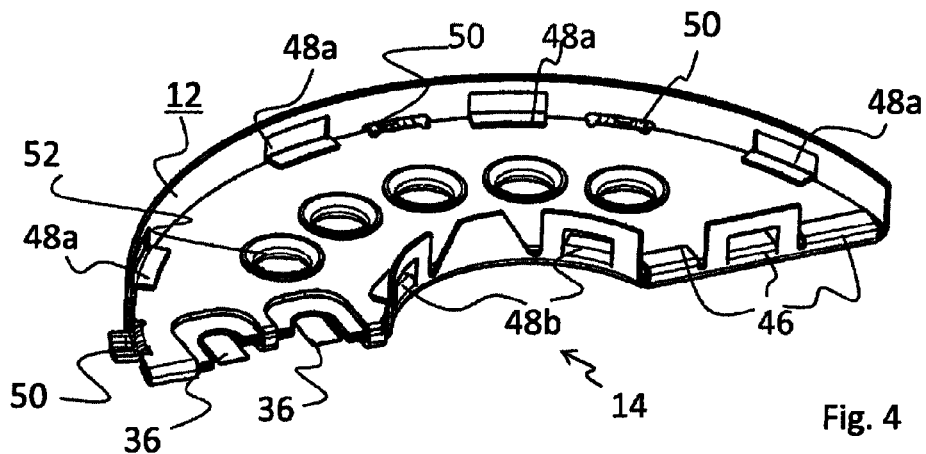
FIG. 4 shows a resistor housing in a perspective view.
Figure 5:
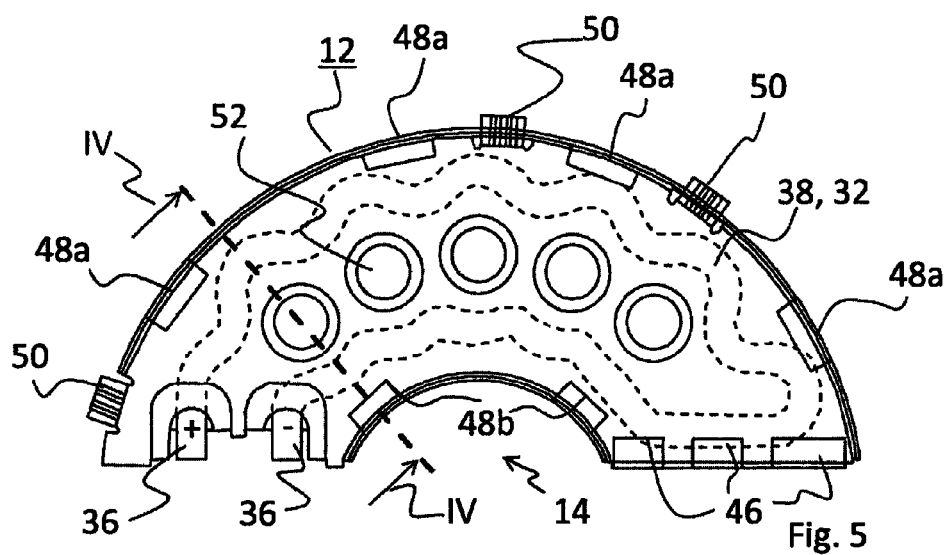
FIG. 5 shows the resistor housing in a plan view.
Figure 6:
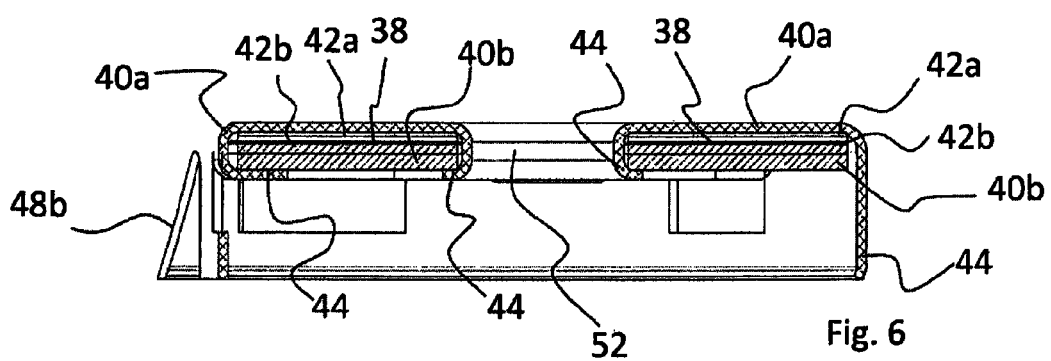
FIG. 6 shows a sectional illustration of the resistor housing along line IV-IV according to FIG. 5.

Resistor housing 12 shown in FIGS. 4 to 6 accommodates the substantially U-shaped and meandering flat resistor 38, shown by dashed lines in FIG. 5. The connecting lugs or resistor terminals 36 of the plus and minus potential are galvanically separated and are arranged spatially spaced apart here.

As is evident in FIG. 6, resistor housing 12 has a substantially sandwich-like structure. A top semi-annular housing part 40a, a first mica layer 42a, resistor meander 38, a second mica layer 42b, and a bottom semi-annular housing part 40b are crimped together by means of bending lugs 44 of top semi-annular housing part 40*a*. Resistor 38, on the one hand, is separated galvanically from metallic housing parts 40*a* and 40*b* by mica layers 42*a* and 42*b* and, on the other, is furthermore coupled to them in a thermally conductive manner.

Support plate 10 and resistor housing 12 of brush system 6 are arranged in a plane. Support plate 10 is coupled, on the one hand, by means of bus bars 34 and connecting lugs 36 to a narrow side of resistor housing 12 and, on the other, connected by means of a plug-in connection 46 to semi-annular housing part 40*b*. Resistor housing 12 has a number of extensive locking tongues 48*a* for snapping into place or locking in place in corresponding recesses of motor housing 4 and on the inner circumference two locking tongues 48*b* for connecting to electric motor 16. In addition, a number of support structures 50 for support/placing on motor housing 4 are arranged on the outer circumference. Corresponding support structures are also arranged on support plate 10, but are not provided in greater detail with reference characters for the sake of better clarity.

To assure a high removal rate for the heat generated during operation at flat resistor (resistor meander) 38, resistor housing 12 has a number of ventilation holes 52 for ventilation or air cooling of housing 12. Only one ventilation hole 52 is labeled by way of example in the figures. Semi-annular housing parts 40*a* and 40*b* are made as stamped plates, for example, of aluminum or other metal, whereby ventilation holes 52 are formed by punched holes. Depending on the field of application, the number or dimensions of ventilation holes 52 can be adjusted, so that a sufficiently high ventilation of drive 2 can always be achieved. To further improve the heat removal, resistor housing 12 is coupled in a thermally conductive manner to motor housing 4, so that the heat in the interior of resistor housing 12 can be removed to the outside through motor housing 4.

Brush system 8 for an electric motor 16 according to the invention thus comprises a substantially semi-annular resistor housing 12 with an electrical flat resistor 38 introduced therein, two resistor terminals 36 protruding from resistor housing 12 and disposed on the same narrow side of resistor housing 12, and a substantially semicircular support plate 10 with two bus bars 34 for the electro-conductive coupling of conducting path 32 to terminals 36 and to brush elements 22.

The invention is not limited to the exemplary embodiments described above. Rather, other variants of the invention can also be derived herefrom by the person skilled in the art, without going beyond the subject matter of the invention. Furthermore, all individual features described in relation to the different exemplary embodiments in particular can also be combined with one another in a different manner, without going beyond the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A brush system for an electric motor, the brush system comprising:
    a substantially semi-annular resistor housing with a flat electrical resistor introduced therein;
    two resistor terminals that protrude from the resistor housing and are coupled in an electrically conductive manner with a conductor path of the electric motor;
    a substantially semicircular support plate with two bus bars for the electro-conductive coupling of the conductor path to the resistor terminals; and
    two brush elements connected to interference-suppression elements as sliding contacts for a commutator of the electric motor,
    wherein the resistor terminals are positioned on a same narrow side of the resistor housing, and
    wherein the brush elements and the interference-suppression elements are arranged on a bottom side of the support plate, and wherein the bus bars and the resistor terminals are arranged on a top side of the support plate.

2. The brush system according to claim 1, wherein the flat electrical resistor extends substantially over an entire length of the resistor housing.

3. The brush system according to claim 1, wherein the flat electrical resistor has a meandering course between the two resistor terminals.

4. The brush system according to claim 1, wherein the resistor housing comprises two semi-annular housing parts arranged on top of one another, in whose interspace the flat resistor is arranged.

5. The brush system according to claim 4, wherein, in an assembled state, an electrically nonconductive isolation layer is arranged between the semi-annular housing parts of the resistor housing and the flat electrical resistor.

6. An electric motor comprising:
    a motor housing; and
    a brush system according to claim 1.

7. The electric motor according to claim 6, wherein the resistor housing comprises two semi-annular housing parts arranged on top of one another, in whose interspace the flat resistor is arranged, and wherein the semi-annular housing parts are made of a metal and are coupled in a thermally conductive manner to a motor housing.

8. The electric motor according to claim 6, wherein the resistor housing has a plurality of locking brackets for a nondestructive attachment to a motor housing and/or to a support plate.

9. The brush system according to claim 1, wherein the semi-annular resistor housing has a first distal end and a second distal end, and wherein the resistor terminals are positioned on the same narrow side of the resistor housing such that the resistor terminals both protrude from the first distal end of the resistor housing.

10. The brush system according to claim 1, wherein the bottom side opposes the top side.

11. The brush system according to claim 1, wherein the resistor terminals are formed, respectively, by a first distal end and a second distal end of the flat electrical resistor, the first distal end and the second distal end of the flat electrical resistor protruding from the resistor housing.

12. A brush system for an electric motor, the brush system comprising:
    a substantially semi-annular resistor housing with a flat electrical resistor introduced therein;
    two resistor terminals that protrude from the resistor housing and are coupled in an electrically conductive manner with a conductor path of the electric motor;
    a substantially semicircular support plate with two bus bars for the electro-conductive coupling of the conductor path to the resistor terminals; and
    two brush elements connected to interference-suppression elements as sliding contacts for a commutator of the electric motor, wherein the resistor terminals are positioned on a same narrow side of the resistor housing, wherein the resistor housing comprises two semi-annular housing parts arranged on top of one another, in whose interspace the flat resistor is arranged, and wherein the semi-annular housing parts are shell-shaped and have circumferentially arranged lugs, which in an assembled state are bent inward or crimped.

* * * * *